(12) United States Patent
Ohuchida et al.

(10) Patent No.: US 6,876,621 B2
(45) Date of Patent: Apr. 5, 2005

(54) OPTICAL APPARATUS FOR RECORDING/ REPRODUCING AND READING/ REPRODUCING DATA ON AN OPTICAL RECORDING MEDIUM, AND METHOD FOR USING SAME

(75) Inventors: Shigeru Ohuchida, Tokyo (JP); Hiroyoshi Funato, Tokyo (JP)

(73) Assignee: Ricoh Company, Ltd., Kanagawa (JP)

( * ) Notice: Subject to any disclaimer, the term of this patent is extended or adjusted under 35 U.S.C. 154(b) by 515 days.

(21) Appl. No.: 09/800,586

(22) Filed: Mar. 8, 2001

(65) Prior Publication Data

US 2001/0026523 A1 Oct. 4, 2001

(30) Foreign Application Priority Data

Mar. 9, 2000 (JP) ........................................ 2000-065384

(51) Int. Cl.[7] .............................................. G11B 7/135
(52) U.S. Cl. .............................. 369/112.09; 369/112.07; 369/112.29; 369/112.17
(58) Field of Search ....................... 369/112.07, 112.09, 369/53.26, 118, 112.29, 112.1, 112.12

(56) References Cited

U.S. PATENT DOCUMENTS

| | | | | |
|---|---|---|---|---|
| 5,212,572 A | * | 5/1993 | Krantz et al. | ............ 369/112.1 |
| 5,495,464 A | * | 2/1996 | Fujikawa et al. | ........... 369/121 |
| 5,544,143 A | * | 8/1996 | Kay et al. | .............. 369/112.07 |
| 6,084,844 A | * | 7/2000 | Takeda | ..................... 369/112.1 |
| 6,463,023 B1 | * | 10/2002 | Miura | ..................... 369/53.26 |
| 6,507,548 B1 | * | 1/2003 | Kim et al. | ............. 369/112.01 |
| 6,512,608 B2 | * | 1/2003 | Ohyama | ...................... 359/15 |

FOREIGN PATENT DOCUMENTS

| | | |
|---|---|---|
| JP | 61-233440 | 10/1986 |
| JP | 4032032 | 2/1992 |
| JP | 04032032 A | 4/1992 |
| JP | 9-128794 | 5/1997 |
| JP | 9-259465 | 10/1997 |

* cited by examiner

*Primary Examiner*—Michael Battaglia (57) ABSTRACT

An optical pickup apparatus used in an optical data recording/reproducing apparatus for reading/reproducing data on an optical recording medium, including a light source, a diffracting device configured to transmit a light beam and to diffract a light beam reflected from the optical recording medium, an optical device having a reflecting portion and a transmitting portion configured to reflect one part of the light beam emitted from the light source and to transmit another part of the light beam to the optical recording medium and from the optical recording medium, and a photodetecting device to detect the light beam from the optical recording medium for signal light detection, and the light beam reflected by the reflecting portion of the optical device for monitor light detection of the light source.

2 Claims, 10 Drawing Sheets

OPTICAL APPARATUS FOR RECORDING/REPRODUCING AND READING/REPRODUCING DATA ON AN OPTICAL RECORDING MEDIUM, AND METHOD FOR USING SAME

The present application contains subject matter disclosed in Japanese Patent Application No. 2000-065384 filed on Mar. 9, 2000 in the Japan Patent Office, to which the present application claims priority, and the entire contents of which are incorporated herein by reference.

BACKGROUND OF THE INVENTION

1. Field of the Invention

The present invention relates to an optical pickup apparatus used in optical data recording/reproducing, and particularly to an optical pickup apparatus having a relatively small size and high performance.

2. Discussion of the Background

Generally, in an optical pickup apparatus, a light beam emitted from a semiconductor laser diode of a light source is transmitted through a diffracting device, and the light beam is converted to a parallel light by a collimating lens and is irradiated onto a surface of an optical recording medium by an objective lens. A light beam reflected from the surface of the optical recording medium is returned via the same optical path as that of the irradiated light, is diffracted by the diffraction device, and is received on a photodetecting device so that signal light detection is executed.

During this signal light detection, unless intensity of the light beam from the semiconductor laser diode is constant, accurate signal light detection cannot be executed. Therefore, in conventional optical pickup apparatuses, the power of the emitted light beam has been monitored.

In one such optical pickup apparatus, in Japanese Patent No. 2543227 for example, an optical disk apparatus is proposed which includes a laser light emitting device serving as a light source, and a first optical device which focuses a light emitted from the laser light emitting device onto a data recording surface serving as an optical disk. A second optical device includes a first region for generating a first diffracting light of a transmitting type hologram, which generates a first diffracting light corresponding to a focusing error or a tracking error in an optical pickup with respect to the data recording surface of the optical disk on the basis of a light reflected from the data recording surface, and a second region for generating a second diffracting light of a reflection type hologram, the second region being coated on its surface by a film of a predetermined reflectance and which generates a second diffracting light corresponding to a monitor light by reflecting and diffracting a part of the light emitted from the laser light emitting device toward the data recording surface. A photodetector detects the first and the second diffracting lights generated by the second optical device, and a focusing controlling device focuses the light beam according to an output of the photodetector. A tracking controlling device tracks a predetermined position according to an output of the photodetector, and an output controlling device controls an output of the laser light emitting device to a predetermined value according to an output of the photodetector.

Namely, in the above described optical disk apparatus, the second optical device is provided with a first region for generating a first diffracting light which generates the first diffracting light, corresponding to a focusing error or a tracking error of an optical pickup with respect to a data recording surface of the optical disk on the basis of a light reflected from the data recording surface, and a second region for generating a second diffracting light, the second region being coated on its surface by a film of a predetermined reflectance and which generates a second diffracting light corresponding to the monitor light by reflecting and diffracting a part of a light emitted from a laser emitting device toward the data recording surface. Further, the first diffracting light and the second diffracting light which are generated in the second optical device are detected on a photodetector, and the output of the laser light emitting device is controlled by using the output of the photodetector of this optical disk apparatus. Thereby, the optical pickup apparatus is made small in size and at low cost.

Also, a technique to increase light utilization efficiency and to obtain a signal of high signal to noise ratio by using a polarization hologram has been proposed (see "HOE unit of high efficiency for DVD (2)" in Applied Physics Society in spring of 1998).

In this technique, signal light detection is executed by using a polarization hologram, and further a reflection hologram, which is not a polarization hologram but a general hologram and formed beside the polarization hologram, for detecting a monitor light. The reflection hologram is formed on a board which is separate from the board of the polarization hologram for signal light detection, and the two boards are aligned in position, pasted, and integrated to each other.

However, in such conventional techniques, in order to further reduce size and lower cost, and also to detect a signal further accurately, further improvement has been necessary.

Namely, in the optical disk apparatus disclosed in Japanese Patent No. 2543227, the second optical device is provided with a first region for generating a first diffracting light of a transmitting type hologram which generates a first diffracting light corresponding to a focusing error and a tracking error in an optical pickup with respect to a data recording surface on the basis of the light reflected from an optical recording surface, and a second region, for generating a second diffracting light of a reflecting type hologram, which is coated on its surface by a film of a predetermined reflectance and which generates a second diffracting light corresponding to a monitor light by reflecting and diffracting a part of a light emitted from a laser light emitting device toward the data recording surface. If the optical pickup apparatus is configured such that a transmitting type hologram and a reflecting type hologram are used for increasing the light utilization efficiency and for obtaining a signal of high signal to noise ratio and both holograms exist together on one board for reducing the cost of the apparatus, optimum processing can be executed only for one of the holograms. Therefore, there are problems in that light utilization efficiency and accuracy of signal light detection are reduced.

Further, in the technique disclosed in the HOE unit of high efficiency for DVD (2), the signal light detection is executed by using a polarization hologram, and further a reflection hologram, which is not a polarization hologram but a general hologram and formed beside the polarization hologram, for detecting a monitor light. With this technique, there are problems in that diffraction efficiency of a monitor light is about 20% at most, and that flare light is large. In addition, because the reflection hologram is formed beside the polarization hologram, and alignment of the positions of the polarization hologram and the reflection hologram is required to be executed with high accuracy, the manufacturing efficiency is relatively low, the size of an apparatus is relatively large, and the cost of the apparatus is relatively high.

SUMMARY OF THE INVENTION

Accordingly, an object of the present invention is to provide an optical pickup apparatus used in an optical data recording/reproducing apparatus, in which a signal light and a monitor light are guided to one photodetecting device by using only a transmitting type diffracting device of a transmitting type hologram, and thereby light utilization efficiency can be improved, and accuracy of monitor light detection and signal light detection can be improved.

Another object of the present invention is to provide an optical pickup apparatus, which can be relatively small in size, simple in assembling and low in cost, and in which monitor light detection and signal light detection can be more stable and accurate.

Another object of the present invention is to provide an optical pickup apparatus, in which diffracting efficiency of a diffracting device can be improved, a flare light can be reduced, and monitor light detection and signal light detection can be performed with increased sensitivity.

Another object of the present invention is to provide an optical pickup apparatus in which monitor lights with respect to light sources of plural wavelengths are detected on one detecting device, and thereby a circuit can be relatively simple and low in cost, and accuracy of monitor light detection and signal light detection can be improved.

Another object of the present invention is to provide an optical pickup apparatus, in which a reflecting portion of an optical device with a reflecting portion and a diffracting portion of a diffracting device are formed in positions corresponding to each Far Field Pattern (FFP) of lights of different wavelengths, and in which the diffracting device can be relatively simple in structure, and monitoring light detection and signal light detection can be performed with increased sensitivity.

Another object of the present invention is to provide an optical pickup apparatus in which, with respect to each of light beams of plural wavelengths, diffracting efficiency can be improved, flare light can be reduced, and monitor light detection and signal light detection can be performed with increased sensitivity.

Another object of the present invention is to provide an optical pickup apparatus, in which intensity of a light beam which is guided to a photodetecting device within diffracting lights of ± first order is larger, and signal to noise ratio of monitor light detection and signal light detection can be improved, and a flare light can be reduced.

Those and other objects and advantages are achieved by the present invention which provides an optical pickup apparatus for reading/reproducing data on an optical recording medium, including a light source configured to emit a light beam, a diffracting device configured to transmit the light beam emitted from the light source and to diffract a light beam reflected from the optical recording medium, an optical device having a reflecting portion and a transmitting portion, configured to reflect one part of the light beam emitted from the light source to the diffracting device by the reflecting portion and to transmit another part of the light beam emitted from the light source to the optical recording medium by the transmitting portion, and to transmit the light beam reflected from the optical recording medium to the diffracting device by the transmitting portion, a photodetecting device configured to detect the light beam reflected from the optical recording medium through the optical device and the diffracting device for signal light detection, and wherein the diffracting device includes a diffracting portion to diffract the part of the light beam reflected by the reflecting portion of the optical device to the photodetecting device, so as to be detected on the photodetecting device for monitor light detection of the light source.

A more complete appreciation of the present invention and many of the attendant advantages thereof will be readily obtained as the same becomes better understood by reference to the following detailed description when considered in conjunction with accompanying drawings, wherein:

DETAILED DESCRIPTION OF THE PREFERRED EMBODIMENTS

FIGS. 1–4 are views illustrating an optical pickup apparatus of a first embodiment of the present invention.

Figure 1:
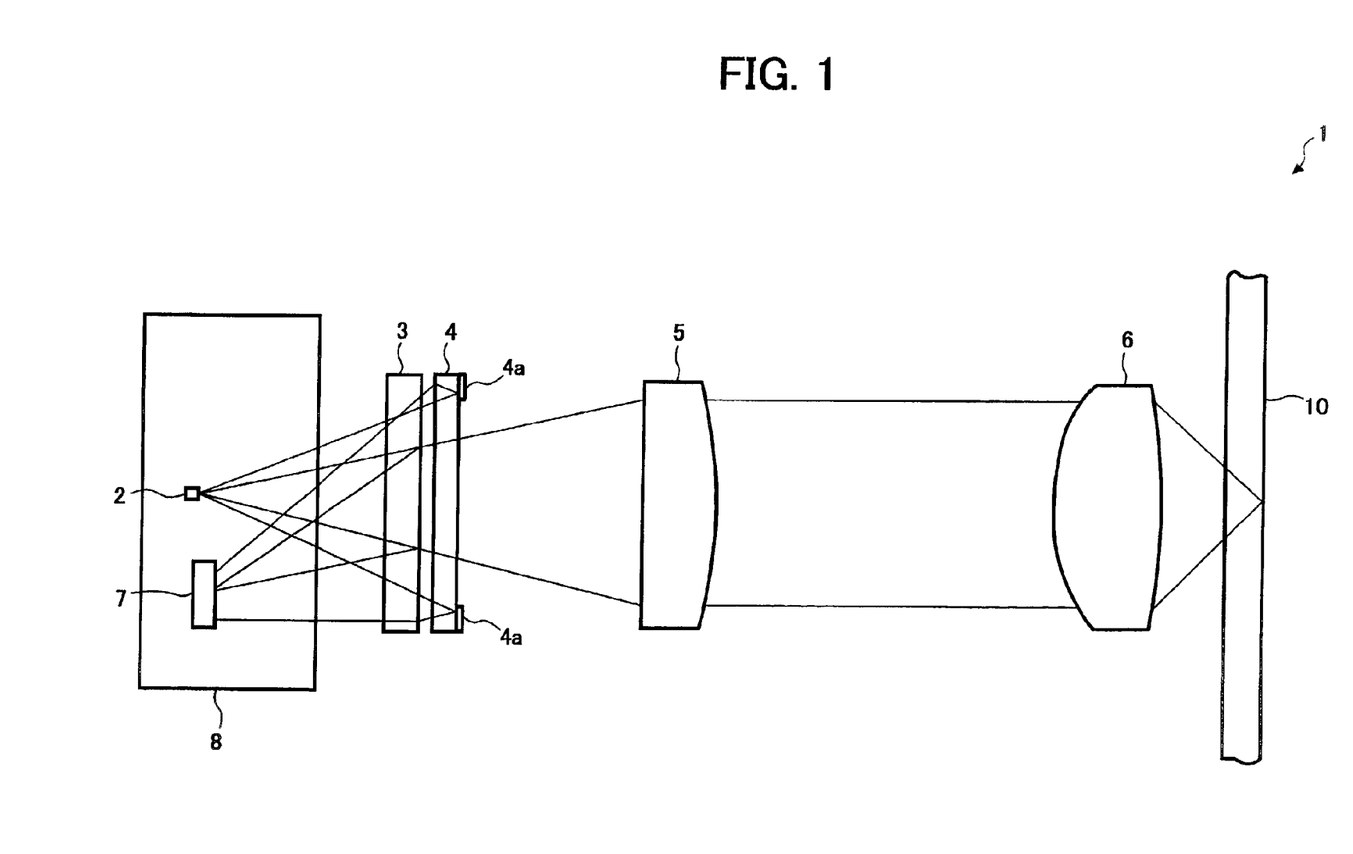
FIG. 1 is a schematic view illustrating an optical pickup apparatus used in an optical data recording/reproducing apparatus of one embodiment of the present invention.

FIG. 1 is a schematic view illustrating an optical pickup apparatus 1 used in an optical data recording/reproducing apparatus of the first embodiment of the present invention. The optical pickup apparatus 1 is provided with a semiconductor laser diode 2 serving as a light source, a diffracting device 3, an optical device with reflecting portion for monitor 4, a collimating lens 5, an objective lens 6, and a photodetecting device 7.

The semiconductor laser diode 2 and the photodetecting device 7 are formed on one board 8, and a light beam is emitted toward the diffracting device 3 by the semiconductor laser diode 2. The light beam emitted toward the diffracting device 3 is incident to the collimating lens 5 through the diffracting device 3 and the optical device with reflecting portion for monitor 4.

Figure 2:
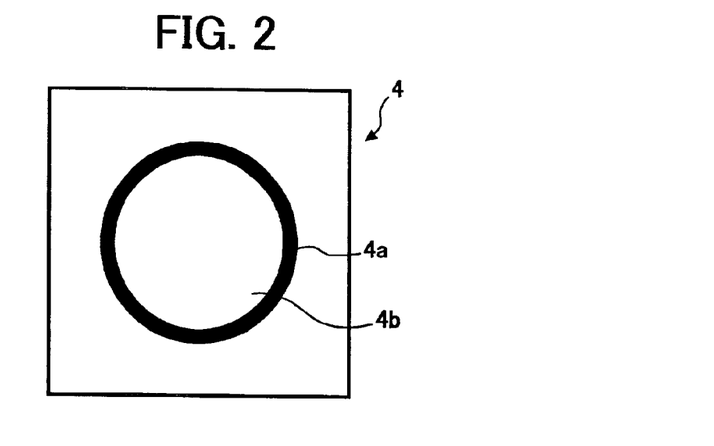
FIG. 2 is a plan view illustrating an optical device of the apparatus in FIG. 1.

In the optical device with reflecting portion for monitor (an optical device with reflecting portion) 4, as illustrated in FIG. 2, a reflecting portion 4a is formed in its peripheral portion, and a transmitting portion 4b is formed in its center portion. The optical device with reflecting portion for monitor 4 transmits only a light beam which is incident to the transmitting portion 4b of the center portion from the diffracting device 3 so as to be incident to the collimating lens 5. The light beam which is incident to the reflecting portion 4a of its peripheral portion is reflected toward the diffracting device 3.

The collimating lens 5 converts the incident light into a parallel light so as to be incident to the objective lens 6. The objective lens 6 focuses the light beam which is incident from the collimating lens 5 so as to be irradiated onto a data recording surface of an optical recording medium 10.

The light which is incident onto the optical recording medium 10 is diffracted by a track formed on the data recording medium surface, and is then reflected as a reflected light to the objective lens 6. The reflected light is incident to the collimating lens 5 through the objective lens 6.

The reflected light which is incident to the collimating lens 5 is incident to the optical device with reflecting portion for monitor 4 through the collimating lens 5, and further it is incident to the diffracting device 3 through the transmitting portion 4b of the device with reflecting portion for monitor 4.

Figure 3:
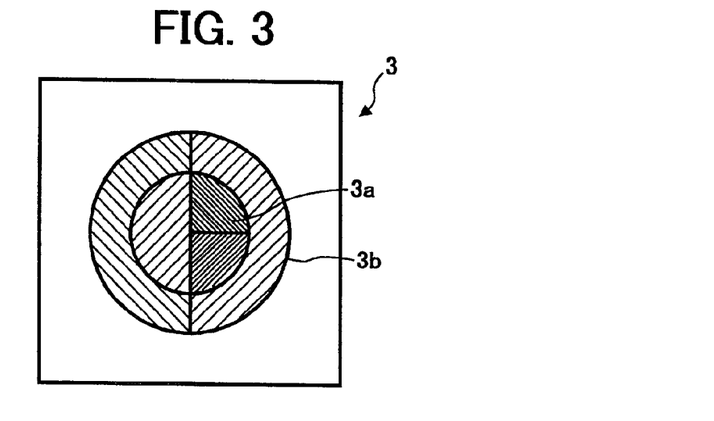
FIG. 3 is a plan view illustrating a diffracting device of the apparatus in FIG. 1.

The diffracting device 3 is provided with a diffracting portion for signal 3a in its center portion, and a diffracting portion for monitor 3b in its peripheral portion, as illustrated in FIG. 3. Also, the diffracting device 3 is a transmitting type diffracting device of a transmitting type hologram.

In the diffracting device 3, the reflected light which is reflected from the optical recording medium 10 and which passes through the collimating lens 5 and the optical device with reflecting portion for monitor 4, is incident onto the diffracting portion for signal 3a. By the diffracting portion for signal 3a, the reflected light from the optical recording medium 10 is diffracted and is made incident onto the photodetecting device 7. Also, the reflected light which is reflected on the reflecting portion 4a of the optical device with reflecting portion for monitor 4 is incident onto the diffracting portion for monitor 3b of the diffracting device 3. By the diffracting portion for monitor 3b, the reflected light from the reflecting portion 4a of the optical device with reflecting portion for monitor 4 is diffracted so as to be incident onto the photodetecting device 7.

Figure 4:
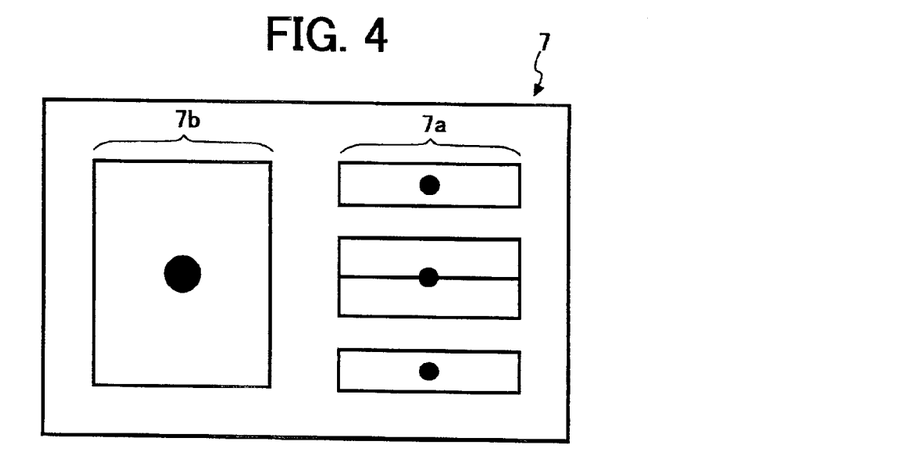
FIG. 4 is a plan view illustrating a photodetecting device of the apparatus in FIG. 1.

In the photodetecting device 7, a photodetecting portion for signal light detection 7a and a photodetecting portion for monitor light detection 7b are arranged in respective regions of the photodetecting device 7, as illustrated in FIG. 4. To the photodetecting portion for signal light detection 7a, the light beam which is diffracted in the diffracting portion for signal 3a of the diffracting device 3 is incident, and to the photodetecting portion for monitor light detection 7b, the light beam which is diffracted in the diffracting portion for monitor 3b of the diffracting device 3 is incident, respectively.

The photodetecting portion for signal light detection 7a and the photodetecting portion for monitor light detection 7b detect the incident light beams, and output signals corresponding to the amounts of the detected lights, receptively.

Next, the function of the above described embodiment will be described. In the optical pickup apparatus 1 of this embodiment, a light beam emitted from the semiconductor laser diode 2 passes through the diffracting device 3 and the transmitting portion 4b of the optical device with reflecting portion for monitor 4, and is incident onto the collimating lens 5. The light beam is converted to a parallel light beam by the collimating lens 5 so as to be incident onto the objective lens 6. The light beam, which is incident onto the objective lens 6 from the collimating lens 5, is irradiated by the objective lens 6 onto a data recording surface of the optical recording medium 10. The reflected light, which is diffracted and reflected on the data recording surface of the optical recording medium 10, passes through the objective lens 6 and the collimating lens 5, which are installed on the same optical path as that of the light from the light source 2 toward the optical recording medium, so as to be incident onto the optical device with reflecting portion for monitor 4.

In the optical pickup apparatus 1, the reflected light, which is incident onto the optical device with reflecting portion for monitor 4, passes through the transmitting portion 4b so as to be incident onto the diffracting portion for signal 3a of the diffracting device 3. The light which is reflected from the optical recording medium 10 is incident onto the detecting portion for signal light detection 7a of the photodetecting device 7 by the diffracting portion for signal 3a as the light beam for signal, and the light beam for signal is detected on the photodetecting portion for signal light detection 7a of the photodetecting device 7.

Additionally, in the optical pickup apparatus 1, the optical device with reflecting portion for monitor 4 is provided with the reflecting portion 4a in its peripheral portion.

The light beam emitted from the semiconductor laser diode 2, which passes through the diffracting device 3 and which is incident to the reflecting portion 4a formed in the peripheral portion of the optical device with reflecting portion for monitor 4, is reflected on the reflecting portion 4a to the diffracting portion for monitor 3b of the diffracting device 3. The light beam, which is reflected to the diffracting portion for monitor 3b, is incident onto the photodetecting portion for monitor light detection 7b of the photodetecting device 7 as a light beam for monitor, and the light beam for monitor is detected by the photodetecting portion for monitor light detection 7b.

As described above, in the optical pickup apparatus 1 of this embodiment, when a light beam from the semiconductor laser diode 2 serving as a light source is irradiated onto a recording surface of the optical recording medium 10 through the diffracting device 3 and a reflected light from the optical recording medium 10 is diffracted by the diffracting device 3 so as to be focused and irradiated onto the photodetecting device 7. The reflecting portion 4a of the optical device with reflecting portion for monitor 4 reflects a part of the light beam, which is emitted from the semiconductor laser diode 2 and which passes through the diffracting device 3, to the diffracting device 3, and the diffracting portion for monitor 3b diffracts the light reflected from the device with reflecting portion for monitor 4 to the photodetecting device 7.

Therefore, by using only a transmitting type diffracting device of a transmitting type hologram, a signal light from the optical recording medium 10 and a monitor light are both guided to the one photodetecting device 7. As a result, the light utilization efficiency and the accuracy of monitor light detection can be improved and further the accuracy of signal light detection can be improved.

Figure 5:
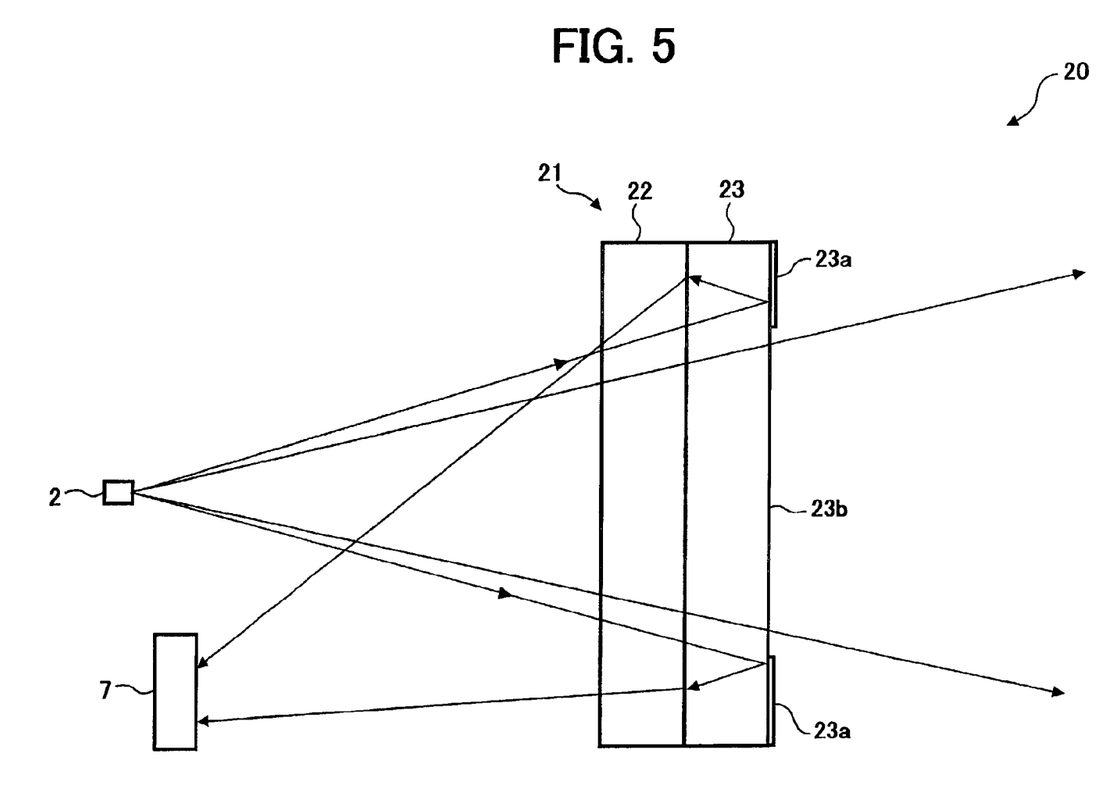
FIG. 5 is a schematic view illustrating an optical pickup apparatus according to another embodiment of the present invention.

FIG. 5 is a schematic view illustrating an optical pickup apparatus according to a second embodiment of the present invention. In this embodiment, a diffracting element and an optical element with reflecting portion are integrated.

The optical pickup apparatus of this embodiment is substantially the same as that of the first embodiment, and the same portions as those of the first embodiment are designated and described by the same reference numerals.

In FIG. 5, an optical pickup apparatus 20 of this embodiment is provided with a diffracting device with reflecting portion 21, and in the diffracting device with reflecting portion 21, a diffracting element 22 and an optical element with reflecting portion for monitor 23 are integrated.

A light beam emitted from the semiconductor laser diode 2 is incident onto the diffracting element 22, and the diffracting element 22 transmits the incident light beam to the optical element with reflecting portion for monitor 23. In the optical element with reflecting portion for monitor 23, a reflecting portion 23a is formed in its peripheral portion and a transmitting portion 23b is formed in its center. The reflecting portion 23a reflects a light beam, which passes through the diffracting element 22 and which is incident to the reflecting portion 23a, toward the diffracting element 22.

The diffracting element 22 has substantially the same structure as that of the diffracting device 3 of the first embodiment, not illustrated in FIG. 5, and a diffracting portion for signal is formed in its center portion and a diffracting portion for monitor is formed in its peripheral portion. A light beam reflected by the reflecting portion 23a of an optical element with reflecting portion for monitor 23 is incident onto the diffracting portion for monitor of the diffracting element 22, and the incident light is diffracted toward the photodetecting device 7 by the diffracting portion for monitor. As in the diffracting device 3 of the above described first embodiment, the light beam which is reflected from the optical recording medium 10 and which passes through the transmitting portion 23b of the optical element with reflection portion for monitor 23 is incident onto the diffracting portion for signal of the diffracting element 22. Therefore, the light beam is diffracted toward the photodetecting device 7 by the diffracting portion for signal of the diffracting element 22.

As described above, in the optical pickup apparatus 20, the diffracting element 22 and the optical element with reflecting portion for monitor 23 are integrated as the diffracting device with reflecting portion 21.

Therefore, the optical pickup apparatus 20 can be made relatively small in size, and simpler to assemble. Further, stable and accurate signal light detection and monitor light detection can be achieved.

Figure 6:
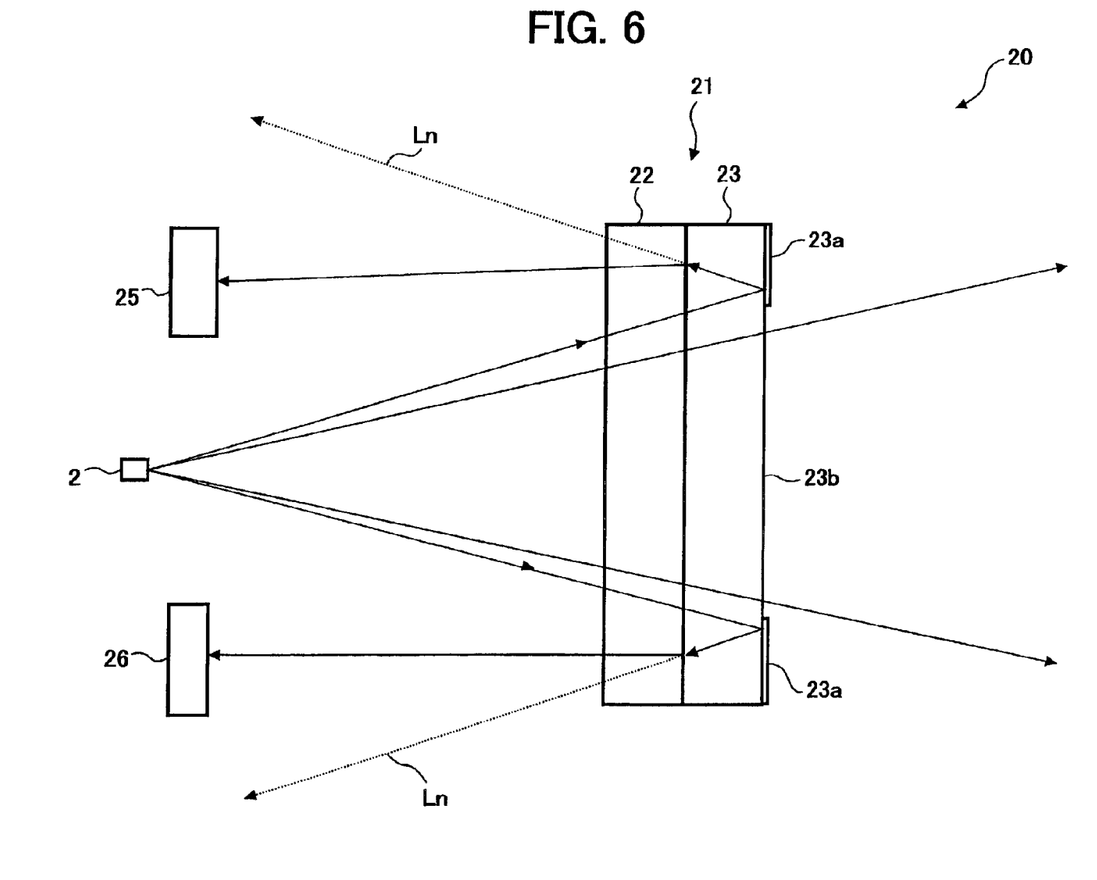
FIG. 6 is a schematic view illustrating an optical pickup apparatus of FIG. 5 having two photodetecting devices.

In this embodiment, a light beam for monitor which is reflected on the reflecting portion 23a of the optical element with reflecting portion for monitor 23, is diffracted by the diffracting portion for monitor of the diffracting element 22 so as to be incident onto the one photodetecting device 7. However, two photodetecting devices 25 and 26 can be arranged as illustrated in FIG. 6. The light beam for monitor, which is reflected on the reflecting portion 23a of the peripheral portion of the optical element with reflecting portion for monitor 23, is divided into two parts by the diffracting portion for monitor of the diffracting element 22, and respective parts of the light beam are diffracted toward nearer one of the photodetecting devices 25 and 26 so as to be respectively detected by the photodetecting devices 25 and 26. In this case, a photodetecting portion for signal light detection and a photodetecting portion for monitor light detection are both formed in one of the photodetecting devices 25 and 26, and only a photodetecting portion for monitor light detection is formed in the other of the photodetecting devices 25 and 26. The light beam for signal which is reflected from the optical recording medium 10 and which is diffracted in the diffracting element 22, is incident onto one of the photodetecting devices 25 and 26 in which both the photodetecting portion for signal light detection and the photodetecting portion for monitor light detection are formed.

Figure 7:
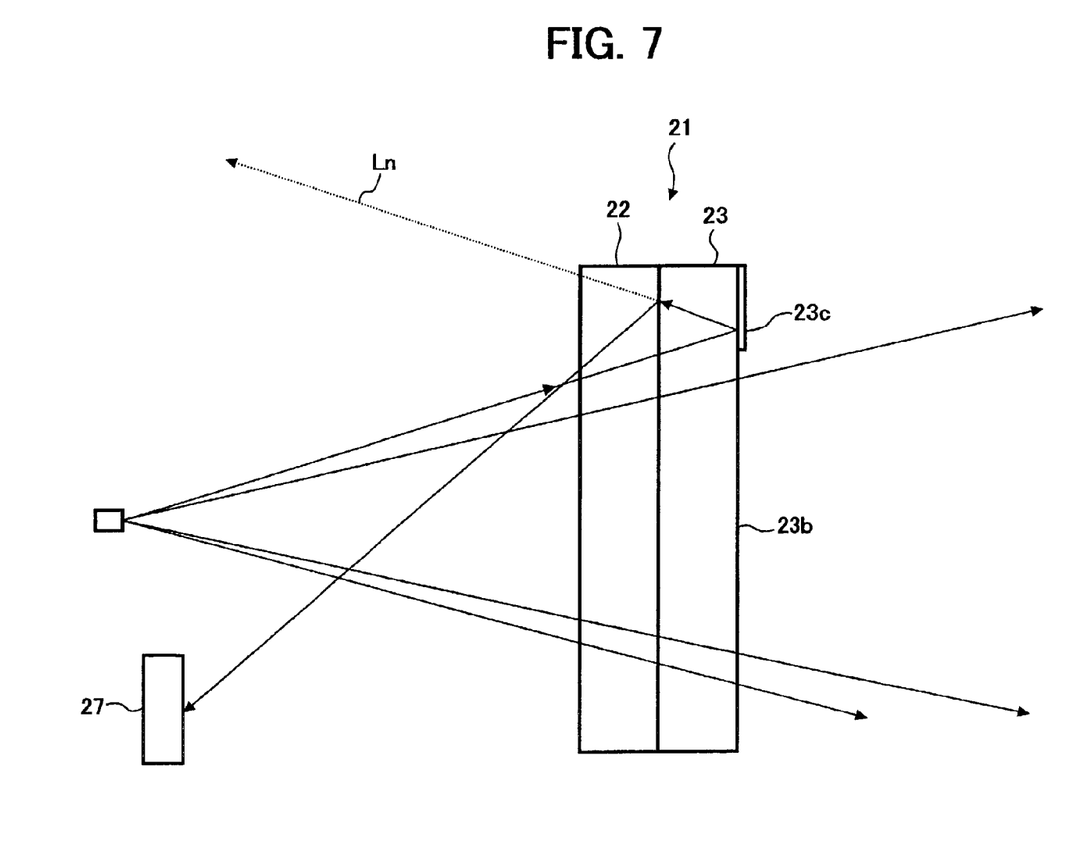
FIG. 7 is a schematic view illustrating an optical pickup apparatus of FIG. 5 having one photodetecting device.

Further, in FIG. 6, the two photodetecting devices 25 and 26 are arranged so that a light beam for monitor, which is reflected from the reflecting portion 23a formed in the peripheral portion of the optical element with reflecting portion for monitor 23 and divided into two parts by the diffracting portion for monitor of the diffracting element 22, is incident onto the two photodetecting devices 25 and 26. However, as illustrated in FIG. 7, only one detecting device 27 may be arranged as in the first embodiment. A reflecting portion 23c is formed only in a predetermined area of the peripheral portion of the optical element with reflective portion for monitor 23 which is farther from the photodetecting device 27, and the reflecting portion 23c is not formed in the peripheral portion which is nearer to the photodetecting device 27.

In this case, the light beam for monitor which is reflected from the reflecting portion 23c of the optical element with reflecting portion for monitor 23 is diffracted toward the photodetecting device 27 by the diffracting portion for monitor of the diffracting element 22, and this light beam for monitor is detected on the photodetecting device 27. Namely, in general, a diffracting device cannot diffract 100% of an incident light, and, for example a non-diffracting light (a transmitting light) Ln, indicated by a dashed line in FIGS. 6 and 7, is more or less generated within an incident light which is reflected from the reflecting portion 23a. Because this non-diffracting light Ln is a radiating light, it may be incident onto the photodetecting devices 25 and 26 as a flare light, and thereby cause detecting accuracy to be reduced.

On the other hand, as illustrated in FIG. 7, by arranging the reflecting portion 23c only in a predetermined area of the peripheral portion of the optical element with reflecting portion for monitor 23 which is farther from the photodetecting device 27, flare light effects can be reduced. Light is reflected from the reflecting portion 23c by the diffracting portion for monitor of the diffracting element 22 toward the photodetecting device 27. Because the non-diffracting light Ln transmitted through the diffracting portion for monitor, which is nearer to the reflecting portion 23c of the diffracting element 22, is further apart from the photodetecting device 27, as illustrated in FIG. 7, the non-diffracting light Ln can be prevented from being incident onto the photodetecting device 27 as a flare light. Therefore, detecting accuracy of a light beam for monitor can be improved.

In FIG. 7, the position of the photodetecting device 27 may be determined in relation to the amount of a light beam for monitor, or an electric system etc. of the optical pickup apparatus 20.

Figure 8:
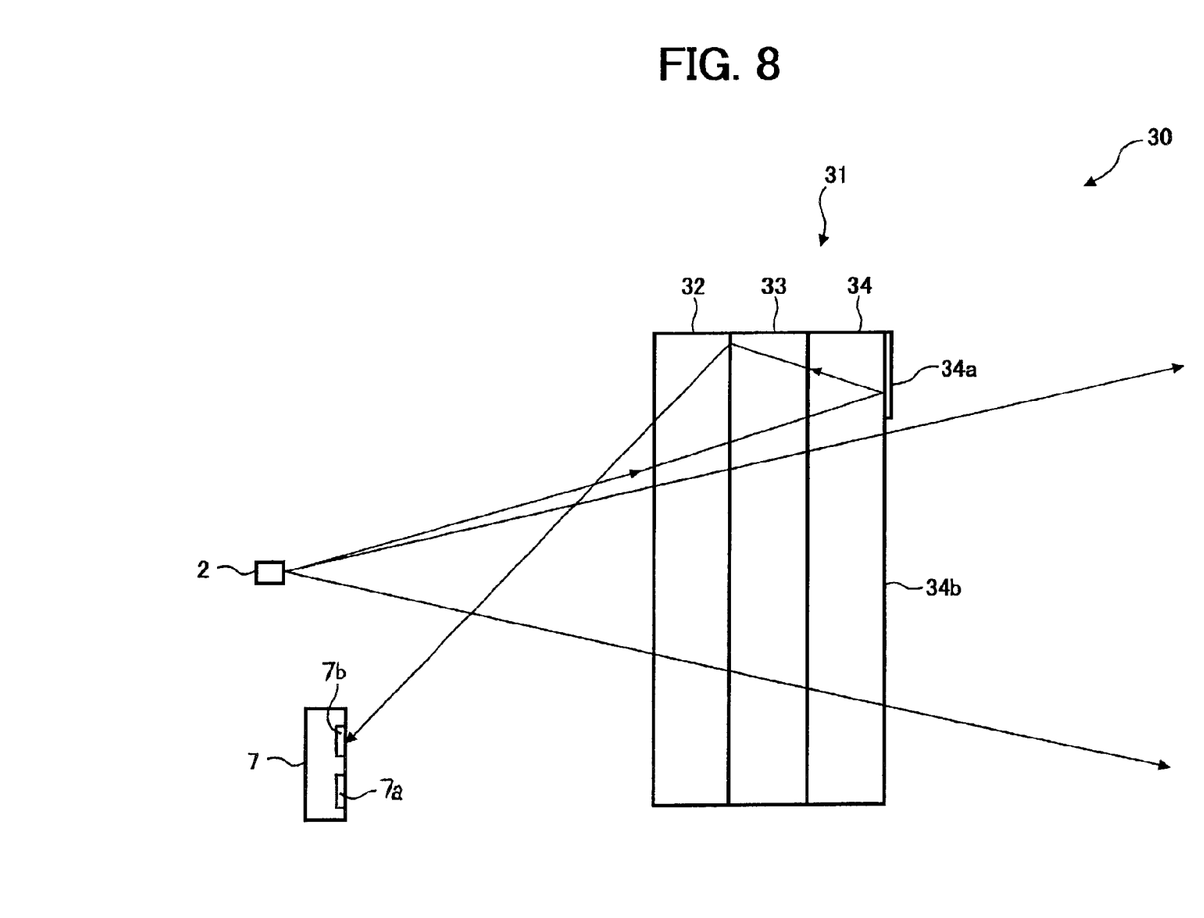
FIG. 8 is a schematic view illustrating an optical pickup apparatus according to another embodiment of the present invention.

FIG. 8 is a view illustrating an optical pickup apparatus according to a third embodiment of the present invention. In this embodiment, a polarization hologram and a quarter wave plate are used as a diffracting element, and further, the polarization hologram, the quarter wave plate and an optical element with reflecting portion for monitor are integrated.

The optical pickup apparatus in this embodiment is substantially the same as that of the first embodiment, and the same portions as those of the first embodiment are designated and described by the same reference numerals.

In FIG. 8, an optical pickup apparatus 30 is provided with a diffracting device with reflecting portion 31, and in the diffracting device with reflecting portion 31, a polarization hologram 32, a quarter wave plate 33, and an optical element with reflecting portion for monitor 34 are integrated.

A light beam which is emitted from the semiconductor laser diode 2 is incident onto the polarization hologram 32. The light beam emitted from the semiconductor laser diode 2 is a linear polarization light. The polarization hologram 32 has a relatively high transmittance, and it transmits a light beam of linear polarization emitted from the semiconductor laser diode 2 nearly 100% so as to be incident to the quarter wave plate 33.

The quarter wave plate 33 converts a light beam which is incident thereto from the polarization hologram 32 into a circular polarization light so as to be incident onto the optical element with reflecting portion for monitor 34.

In the optical element with reflecting portion for monitor 34, a reflecting portion 34a is formed only in a predetermined area which is farther from the position of the photodetecting device 7, and the remaining area is a transmitting portion 34b. The optical element with reflecting potion for monitor 34 transmits the light beam through its transmitting portion 34b, and the light beam is irradiated onto a data recording surface of the optical recording medium 10 through the collimating lens 5 and the objective lens 6 as in the first embodiment, and the reflected light which is reflected from the data recording surface of the optical recording medium 10 and which passes through the objective lens 6 and the collimating lens 5 is incident onto the quarter wave plate 33 through the transmitting portion 34b. A light beam which is incident onto the reflecting portion 34a is reflected to the quarter wave plate 33 as a light beam for monitor, as illustrated by an arrow sign in FIG. 8.

The quarter wave plate 33 converts an incident light beam into a linear polarization light to be incident to the polarization hologram 32.

The polarization hologram 32 diffracts an incident light beam toward the photodetecting device 7 so as to be detected on the photodetecting device 7.

The light beam which is incident onto the polarization hologram 32 includes a light beam for signal which is reflected from the optical recording medium 10 and a light beam for monitor which is reflected on the reflecting portion 34a of the optical element with reflecting portion for monitor 34. From the polarization hologram 32, the light beam for signal is incident onto the photodetecting portion 7a of the photodetecting device 7 and the light beam for monitor is incident onto the photodetecting portion for monitor 7b of the photodetecting device 7.

With respect to a light beam which is reflected from the optical recording medium 10 and which is incident onto the polarization hologram 32, and a light beam which is reflected from the reflecting portion 34a of the optical element with reflecting portion for monitor 34 and which is incident to the polarization hologram 32, the polarization state is rotated 90 degrees. Therefore, transmittance of the polarization hologram 32 is relatively low and diffraction efficiency is relatively high. As a result, a light beam which is diffracted by the polarization hologram 32 can be incident onto the photodetecting device 7 with a relatively high degree of efficiency (30% or more), and accuracy of signal light detection and monitor light detection can be improved.

Also, in the conventional technique described in "HOE unit of high efficiency for DVD (2)" in Applied Physics Society in spring of 1998, as described above, signal light detection is executed by using a polarization hologram, however, monitor light detection is executed by a general reflection hologram, which is not a polarization hologram, in addition to the polarization hologram for signal light detection. Therefore, there is a problem that a reflection hologram needs to be formed besides the polarization hologram. Further, there are problems in that the diffraction efficiency of a monitor light is about 20% at most, and that the flare light is large. In addition, the alignment of positions between the polarization hologram and the reflection hologram needs to be accurate, thereby decreasing the manufacturing productivity. Additionally, the size of an apparatus and the cost of an apparatus are increased.

On the other hand, in the optical pickup apparatus 30 of this embodiment, instead of a reflection hologram, the reflecting portion 34a of the optical element with reflecting portion for monitor 34 is used. Therefore, the manufacturing of an apparatus is relatively easy. Further, the alignment at high accuracy is not necessary because only reflection has to be done. Further, the diffraction efficiency can be improved, and the flare light can be reduced because the monitoring light is also diffracted by using the polarization hologram 32.

Especially, in the optical pickup apparatus 30 of this embodiment, the reflecting portion 34a of the optical element with reflecting portion for monitor 34 is only formed in a predetermined area in a position apart from the photodetecting device 7. Therefore, the flare light can be further prevented from being incident onto the photodetecting device 7.

Figure 9:
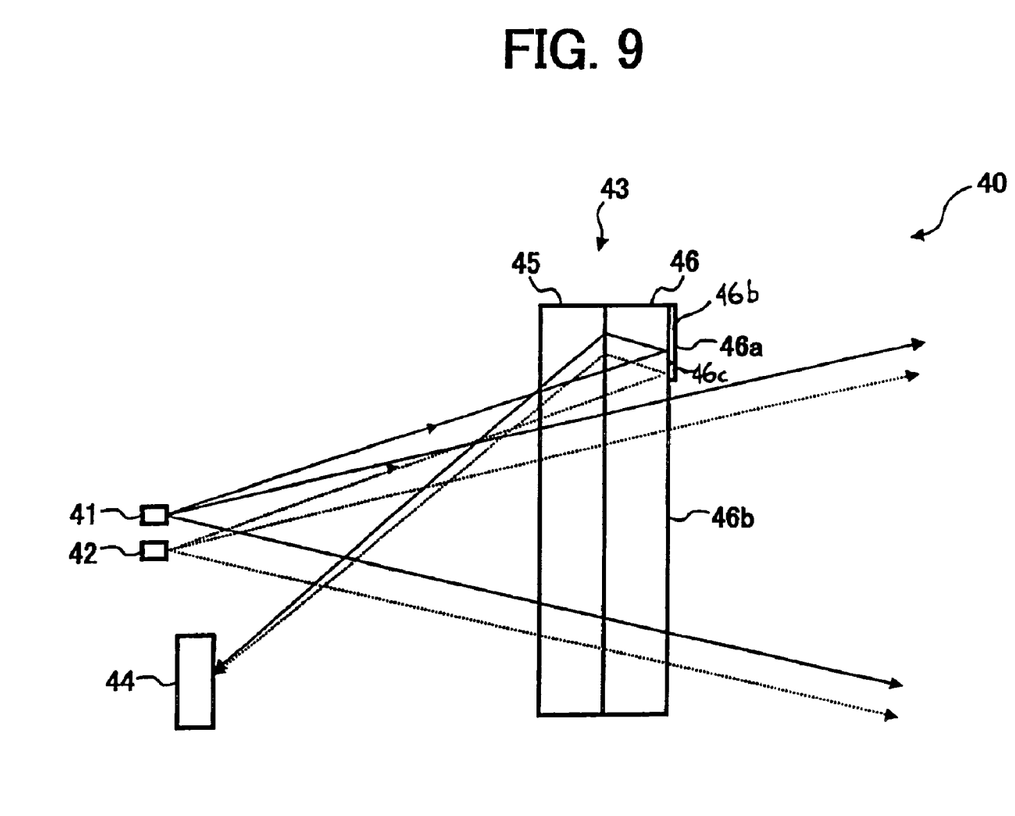
FIG. 9 is a schematic view illustrating an optical pickup apparatus according to another embodiment of the present invention.
Figure 10:
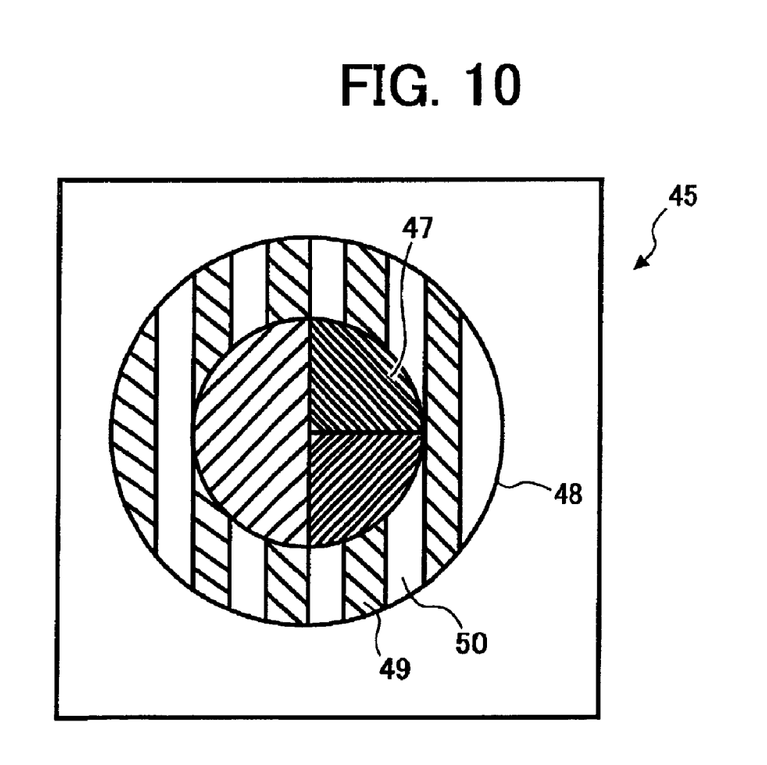
FIG. 10 is a plan view illustrating a diffracting portion of the optical pickup apparatus in FIG. 9.
Figure 11:
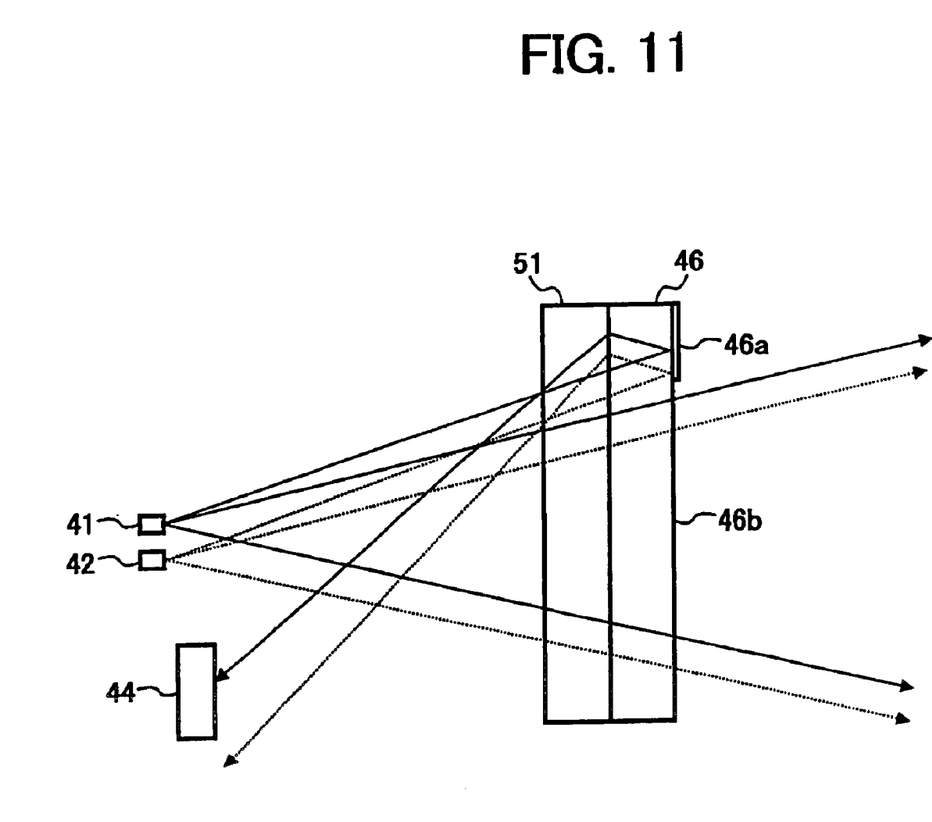
FIG. 11 is a view illustrating one kind of optical pickup apparatus in FIG. 9.

FIGS. 9–11 are views illustrating an optical pickup apparatus according to a forth embodiment of the present invention, in which the light beams for monitor are picked up from the light beams from two light sources of two different wavelengths.

The optical pickup apparatus in this embodiment is substantially the same as that of the first embodiment, and the same portions as those of the first embodiment are designated and described by the same reference numerals.

In FIG. 9, an optical pickup apparatus 40 is provided with two semiconductor laser diodes 41 and 42, a diffracting device with reflecting portion 43, a photodetecting device 44, and a collimating lens 5 and an objective lens 6 etc. which are not illustrated in the figure and which are substantially the same as those in the first embodiment.

The semiconductor laser diodes 41 and 42 emit a light beam of a wavelength (for example 650 or 635 nm) for a medium of a DVD system and a light beam of a wavelength (for example 780 nm) for a medium of a CD system toward a diffracting device with reflecting portion 43.

In the diffracting device with reflecting portion 43, a diffracting element 45 and an optical element with reflecting portion for monitor 46 are integrated, and light beams emitted from the semiconductor laser diodes 41 and 42 are incident onto the diffracting element 45.

In the diffracting element 45, as illustrated in FIG. 10, a diffracting portion for signal 47 is formed in its center portion and a diffracting portion for monitor 48 is formed in its peripheral portion. In the diffracting portion for monitor 48, a hologram 49 for 650 nm (or 635 nm) and a hologram 50 for 780 nm wavelength light beams are formed alternatively.

In the optical element with reflecting portion for monitor 46, a reflecting portion 46a is formed only in a predetermined area of its peripheral portion which is farther from the photodetecting device 44(the reflecting portion 46a is not formed in its peripheral portion which is nearer to the photodetecting device 44), and a transmitting portion 46b is formed in its center portion. In the optical element with reflecting portion for monitor 46, the light beams which are incident from the diffracting portion 45 to the transmitting portion 46b of its center portion are transmitted so as to be incident onto the collimating lens 5, and the light beams which are incident onto the reflecting portion 46a of its peripheral portion are reflected toward the diffracting element 45.

The light beams which are reflected from the reflecting portion 46a of the optical element with reflecting portion for monitor 46 are incident onto the diffracting element 45, and the incident light beams are diffracted toward the photodetecting device 44 according to respective wavelengths of the two light beams by the holograms 49 and 50 so that the two light beams are detected on the photodetecting device 44.

Next, the function of the above described embodiment will be described. As described above, the optical pickup apparatus 40 is provided with the semiconductor laser diodes 41 and 42 which emit light beams of the wavelengths of a DVD system medium and that of a CD system medium in order to record and reproduce data on both system mediums. For example, light beams of the wavelengths of 650 nm (or 635 nm) and 780 nm are emitted.

Of the light beams which are emitted from the semiconductor laser diodes 41 and 42 and which are transmitted through the diffracting element 45 of the diffracting device with reflecting portion 43, the light beams which are incident onto the reflecting portion 46a of the optical element with reflecting portion for monitor 46 are reflected onto the diffracting element 45 as a light beam for monitor.

Referring now to FIG. 11, if the diffracting element 45 includes a diffracting portion 51 which has the same structure as the diffracting device 3 as illustrated in FIG. 3 and which corresponds to only one kind of wavelength, both light beams of two kinds of wavelengths which are emitted from the semiconductor laser diodes 41 and 42 cannot be detected on the detecting device 44.

Namely, if the light beams which have different wavelengths are diffracted by one kind of a diffracting portion 51, they are focused on different positions due to chromatic aberration. If the diffracting portion 51 corresponds only to one wavelength of the two light beams, as illustrated by a solid line in FIG. 11, the light beam of the corresponding wavelength can be detected on the detecting device 44, but the light beam of the other wavelength is focused on a position which is shifted from the photodetecting device 44, as illustrated by a dashed line in FIG. 11.

In this case, if the photodetecting device 44 has to be large, or two photodetecting devices have to be arranged at positions corresponding to different wavelength, respectively, so that detection of the two light beams can be achieved. However, other problems occur such as that the size of an optical pickup apparatus is increased and the cost is increased.

However, in the optical pickup apparatus 40 of this embodiment, the diffracting element 45 has the diffracting portion for monitor 48 in which the hologram 49 for 650 nm (or 635 nm) and the hologram 50 for 780 nm wavelengths are formed alternatively. Therefore, the light beams of different wavelengths which are emitted from the semiconductor laser diodes 41 and 42 are diffracted to the photodetecting device 44 by the holograms 49 and 50, respectively, so as to be detected on the photodetecting device 44, as illustrated in FIG. 9.

Therefore, with respect to the semiconductor laser diodes 41 and 42 that emit plural wavelengths, the monitor light signals can be detected by one detecting device 44, and thereby the circuit can be simple and the cost can be decreased. In addition, the accuracy of monitor light detection and the accuracy of signal light detection can be improved.

Figure 12:
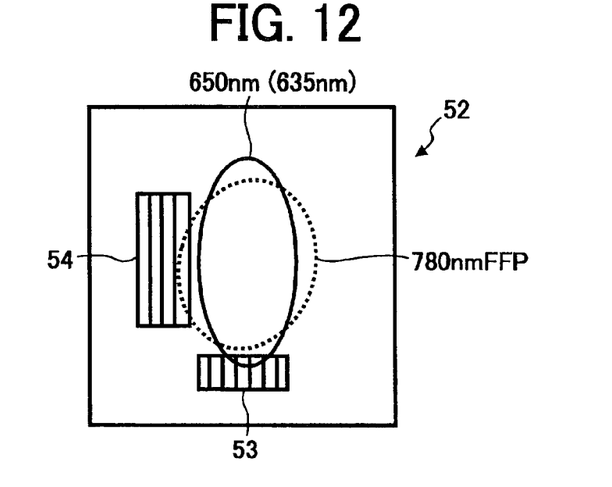
FIG. 12 is a plan view illustrating another type of diffracting portion in FIG. 10.

In this embodiment, although the holograms 49 and 50 in the diffracting portion for monitor 48 are alternatively formed around the circumference of the diffracting portion for signal 47, the forming method of the two kinds of holograms is not so limited. For example, as illustrated in FIG. 12, because the light beam is different in FFP (Far Field Pattern) which is the intensity distribution of a profile of a light beam according to the wavelength, the reflecting portions 46b and 46c (of the reflecting portion 46a as illustrated in FIG. 9) of the optical element with reflecting portion for monitor 46 may be formed only at positions corresponding to FFP of each wavelength, and a hologram 53 and a hologram 54 for respective wavelengths of the two light beams may be formed at positions corresponding to the reflecting portions formed as corresponding to the positions of the FFP. In a diffracting element 52 in FIG. 12, the hologram 53 is for 650 nm (or 635 nm) and the hologram 54 is for 780 nm wavelengths.

Thereby, the reflecting portion of the optical element with reflecting portion for monitor 46 and the holograms 53 and 54 of the diffracting element 52 can be arranged at the positions which correspond to the FFP of the light beams of the different wavelengths, and therefore a simple structure can be achieved. Further, signal light detection and monitor light detection can be achieved with further increase in sensitivity.

In this embodiment, although the diffracting element 45 and the optical element with reflecting portion for monitor 46 are integrated in the diffracting device with reflecting portion 43, the diffracting element 45 may be arranged so as to be apart from the optical element with reflecting portion for monitor 46 as in the first embodiment. However, by configuring the diffracting device with reflecting portion 43 such that the diffracting element 45 and the optical element with reflecting portion for monitor 46 are integrated as in this embodiment, the size of an apparatus can be small made relative small. In addition, the portions to be aligned are decreased so that the manufacturing productivity can be improved.

Further, in this embodiment, although the diffracting device with reflecting portion 43 in which the diffracting element 45 and the optical element with reflecting portion for monitor 46 are integrated is used, diffracting device with reflecting portion for monitor which includes a polarization hologram, a quarter wave plate and an optical element with reflecting portion for monitor can be also used.

Figure 13:
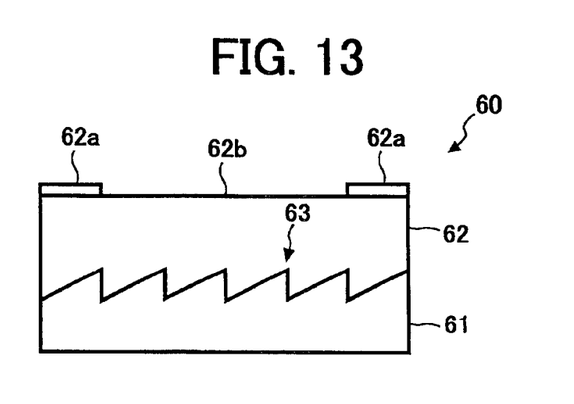
FIG. 13 is a side view illustrating a diffracting device with a reflecting portion in which a diffracting element and an optical element with a reflecting portion for monitor are integrated.
Figure 14:
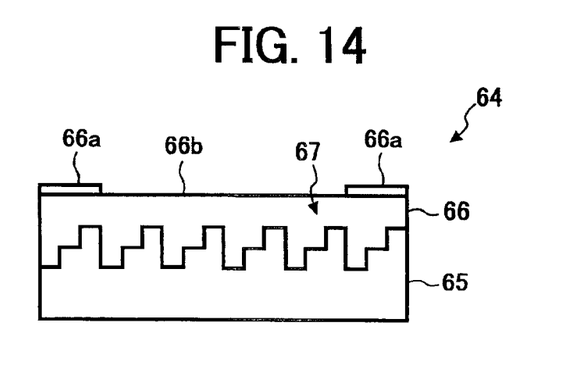
FIG. 14 is a side view illustrating another diffracting device with a reflecting portion.

FIGS. 13 and 14 are views illustrating an optical pickup apparatus of a fifth embodiment, in which, the section form of a diffracting element is formed in a bilateral asymmetry, so that the amount of the light is increased.

The optical pickup apparatus in this embodiment is substantially the same as of the first embodiment, and the same portions as those of the first embodiment are designated and described by the same reference numerals.

FIG. 13 is a side view illustrating a diffracting device with reflecting portion 60 which is used in the optical pickup apparatus according to a fifth embodiment of the present invention. In the diffracting device with reflecting portion 60, a diffracting element 61 and an optical element with reflecting portion for monitor 62 are integrated.

A junction 63 between the diffracting element 61 and the optical element with reflecting portion for monitor 62 is formed at its section in a blaze form of a bilateral asymmetry. In the optical element with reflecting portion for monitor 62, a reflecting portion 62a is formed in its peripheral portion and a transmitting portion 62b is formed in its center portion.

A light beam emitted from the semiconductor laser diode 2, not illustrated in FIG. 13, is incident onto the diffracting portion 61, and the incident light beam is transmitted to the optical element with reflecting portion for monitor 62 by the diffracting element 61.

In the optical element with reflecting portion for monitor 62, a light beam which is incident onto the transmitting portion 62b is irradiated onto a data recording surface of the optical recording medium 10 through the collimating lens 5 and the objective lens 6, not illustrated in FIG. 13. The reflected light from the optical recording medium 10 is incident onto the optical element with reflecting portion for monitor 62 through the objective lens 6 and the collimating lens 5. The incident light beam is then transmitted to the diffracting element 61.

Further, in the optical element with reflecting portion for monitor 62, a light beam which is incident onto its reflecting portion 62a is reflected from the reflecting portion 62a toward the diffracting element 61.

In the diffracting element 61, although not illustrated in FIG. 13, as in the diffracting device 3 of the first embodiment for example, a diffracting portion for signal is formed in its center portion and a diffracting portion for monitor is formed in its peripheral portion. A light beam which is reflected from the reflecting portion 62a of the optical element with reflecting portion for monitor 62 is diffracted toward the photodetecting device 7, not illustrated in FIG. 13, by the diffracting portion for monitor of the diffracting element 61. Also, a light beam which is reflected from the optical recording medium 10 and which is transmitted through the transmitting portion 62b of the optical element with reflecting portion for monitor 62 is incident onto the diffracting portion for signal of the diffracting element 61, and is then diffracted toward the photodetecting portion 7.

In the optical pickup apparatus of this embodiment, the junction 63 between the diffracting element 61 and the optical element with reflecting portion for monitor 62 of the diffracting device with reflecting portion 60 is formed in blaze form, and a light beam for monitor which is reflected from the reflecting portion 62a of the optical element with reflecting portion for monitor 62 and a light beam for signal which is transmitted through the transmitting portion 62b of the optical element with reflecting portion for monitor 62 are diffracted and are incident onto the photodetecting device 7 by the junction 63.

Therefore, a diffracting light which is not incident onto the photodetecting device 7, for example high order lights of second or higher order and one of ± first order lights, which are not guided to the photodetecting device 7 can be decreased, and the other of the ± first order lights which are guided to the photodetecting device, can be increased.

In this embodiment, although the junction 63 between the diffracting element 61 and the optical element with reflecting portion for monitor 62 is formed in a blaze form, as illustrated in FIG. 14, the form of the junction is not so limited. For example, referring to FIG. 14, a diffracting device with reflecting portion 64 may be formed such that the diffracting portion 65 and an optical element with reflecting portion for monitor 66 are integrated and the section of junction 67 between the diffracting element 65 and the optical element with reflecting portion for monitor 66 can be formed in a multi-level form of bilateral asymmetry. In FIG. 14, in the optical element with reflecting portion for monitor 66, a reflecting portion 66a is formed in its peripheral portion and a transmitting portion 66b is formed in its center portion. Thereby, the same technical advantages as described above can be also obtained.

Finally, technical advantages of different embodiments of the present invention will be described.

According to one aspect of the present invention, an optical pickup apparatus used in an optical data recording/reproducing apparatus for reading/reproducing data on an optical recording medium includes a light source configured to emit a light beam, a diffracting device configured to transmit the light beam emitted from the light source, and to diffract the light beam reflected from the optical recording medium, an optical device having a reflecting portion and a transmitting portion, configured to reflect one part of the light beam emitted from the light source to the diffracting device by the reflecting portion and to transmit the other part of the light beam emitted from the light source to the optical recording medium by the transmitting portion, and to transmit the light beam reflected from the optical recording medium to the diffracting device by the transmitting portion, a photodetecting device configured to detect the light beam reflected from the optical recording medium through the optical device with reflecting portion and the diffracting device for signal light detection, and wherein the diffracting device includes a diffracting portion to diffract the one part of the light beam reflected by the reflecting portion of the optical device with reflecting portion to the photodetecting device, so as to be detected on the photodetecting device for monitor light detection of the light source. Therefore, a signal light and a monitor light are guided to one photodetecting device by using only a transmitting type diffracting device of a transmitting type hologram, and thereby light utilization efficiency and accuracy of monitor light detection and signal light detection can be improved.

According to another aspect of the present invention, in an optical pickup apparatus, the optical device with reflecting portion is integrated with the diffracting device. Therefore, the size of the apparatus can be relatively small, assembling of the apparatus can be simplified and the cost of the apparatus can be relatively low. Further, monitor light detection and signal light detection can be more stable and accurate.

According to another aspect of the present invention, in an optical pickup apparatus, the diffracting device may include a polarization hologram portion for monitor configured to diffract the light beam reflected from the optical device with reflecting portion to the photodetecting device for monitor light detection. Therefore, diffracting efficiency can be improved, flare light can be reduced, and monitor light detection and signal light detection can be performed with increased sensitivity.

According to another aspect of the present invention, an optical pickup apparatus used in an optical data recording/reproducing apparatus for reading/reproducing data on an optical recording medium includes multiple light sources configured to emit light beams of different wave lengths, a diffracting device configured to transmit the light beams emitted from the light sources and to diffract the light beams reflected from the optical recording medium, an optical device with reflecting portion having a reflecting portion and a transmitting portion configured to reflect one part of the light beams emitted from the light sources to the diffracting device by the reflecting portion, and to transmit the other parts of the light beams emitted from the light sources to the optical recording medium by the transmitting portion, and to transmit the light beams reflected from the optical recording medium to the diffracting device by the transmitting portion, a photodetecting device, configured to detect the light beams reflected from the optical recording medium through the optical device with reflecting portion and the diffracting device for signal light detection, and wherein the diffracting device includes plural diffracting portions, in which each of the diffracting portions corresponds to one of the different wavelengths, to diffract the respective one parts of the light beams reflected by the reflecting portion of the optical device with reflecting portion to the photodetecting device, so as to be detected on the photodetecting device for monitor light detection of each of the light sources. Therefore, because monitor lights with respect to the light sources of plural wavelengths are detected on one detecting device, a circuit can be simpler and cost can be lower, and accuracy of monitor light detection and signal light detection can be improved.

According to another aspect of the present invention, in an optical pickup apparatus, wherein the reflecting portion of the optical device with reflecting portion includes plural reflecting portions arranged at positions corresponding to the light beams of the plural wavelengths, and the plural diffracting portions of the diffracting device are arranged at positions corresponding to the plural reflecting portions of the optical device with reflecting portion respectively, and the light beams of different wavelengths reflected from the plural reflecting portions of the optical device with reflecting portion are diffracted by the plural diffracting portions of the diffracting device to the photodetecting device, so as to be detected on the photodetecting device for monitor light detection of each of the light sources. Therefore, a reflecting portion of an optical device with reflecting portion and a diffracting portion of a diffracting device are formed in position corresponding to each FFP of lights of different wavelengths, and the diffracting device can be simpler in structure, and monitor light detection and signal light detection can be more sensitive.

According to another aspect of the present invention, in an optical pickup apparatus, the optical device with reflecting portion is integrated with the diffracting device. Therefore, size can be smaller, assembling ability can be simpler and cost can be lower, and monitor light detection and signal light detection can be more stable and accurate.

According to another aspect of the present invention, in an optical pickup apparatus, the diffracting device is a polarization hologram whose diffracting function is different according to polarization state of the incident light beam, and includes plural polarization hologram portions configured to diffract the light beams of different wavelengths reflected from the optical device with reflecting portion to the photodetecting device for monitor light detection. Therefore, with respect to each of light beams of plural wavelengths, diffracting efficiency can be improved, flare light can be reduced, and monitor light detection and signal light detection can be more sensitive.

According to another aspect of the present invention, in an optical pickup apparatus, a section of the diffracting device at a side of the optical device with a reflecting portion is formed in bilateral asymmetry. Therefore, intensity of a light beam which is guided to a photodetecting device within diffracting lights of ± first order can be large, and signal to noise ratio of monitor light detection and signal light detection can be improved, and a flare light can be reduced.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An optical pickup apparatus for reading/reproducing data on an optical recording medium, comprising:
   light sources configured to emit light beams of different wavelengths;
   a diffracting device configured to transmit the light beams emitted from the light sources and to diffract light beams reflected from the optical recording medium;
   an optical device having a reflecting portion and a transmitting portion, configured to reflect one part of the light beams emitted from the light sources to the diffracting device by the reflecting portion and to transmit other parts of the light beams emitted from the light sources to the optical recording medium by the transmitting portion, and to transmit the light beams reflected from the optical recording medium to the diffracting device by the transmitting portion;
   a photodetecting device configured to detect the light beams reflected from the optical recording medium through the optical device with reflecting portion and the diffracting device, for signal light detection;
   wherein the diffracting device includes plural diffracting portions, in which each of the diffracting portions corresponds to one of the different wavelengths, to diffract the respective parts of the light beams reflected by the reflecting portion of the optical device to the photodetecting device, so as to be detected on the photodetecting device for monitor light d of each of the light sources; and
   wherein the reflecting portion of the optical device includes plural reflecting portions arranged at positions corresponding to the light beams of the plural wavelengths, and the plural diffracting portions of the diffracting device are arranged at positions corresponding to the plural reflecting portions of the optical device respectively, and the light beams of different wavelengths reflected from the plural reflecting portions of the optical device are diffracted by the plural diffracting portions of the diffracting device to the photodetecting device for monitor light detection of each of the light sources.

2. An optical pickup apparatus for reading/reproducing data on an optical recording medium, comprising:
   light sources configured to emit light beams of different wavelengths;
   a diffracting device configured to transmit the light beams emitted from the light sources and to diffract light beams reflected from the optical recording medium;
   an optical device, integrated with the diffracting device, having a reflecting portion and a transmitting portion, configured to reflect one part of the light beams emitted from the light sources to the diffracting device by the reflecting portion and to transmit other parts of the light beams emitted from the light sources to the optical recording medium by the transmitting portion, and to transmit the light beams reflected from the optical recording medium to the diffracting device by the transmitting portion;
   a photodetecting device configured to detect the light beams reflected from the optical recording medium through the optical device with reflecting portion and the diffracting device, for signal light detection; and
   wherein the diffracting device includes plural diffracting portions, in which each of the diffracting portions corresponds to one of the different wavelengths, to diffract the respective parts of the light beams reflected by the reflecting portion of the optical device to the photodetecting device, so as to be detected on the photodetecting device for monitor light detection of each of the light sources, and wherein a section of the diffracting device at a side of the optical device forms a section of bilateral asymmetry.

* * * * *